Figure 1:
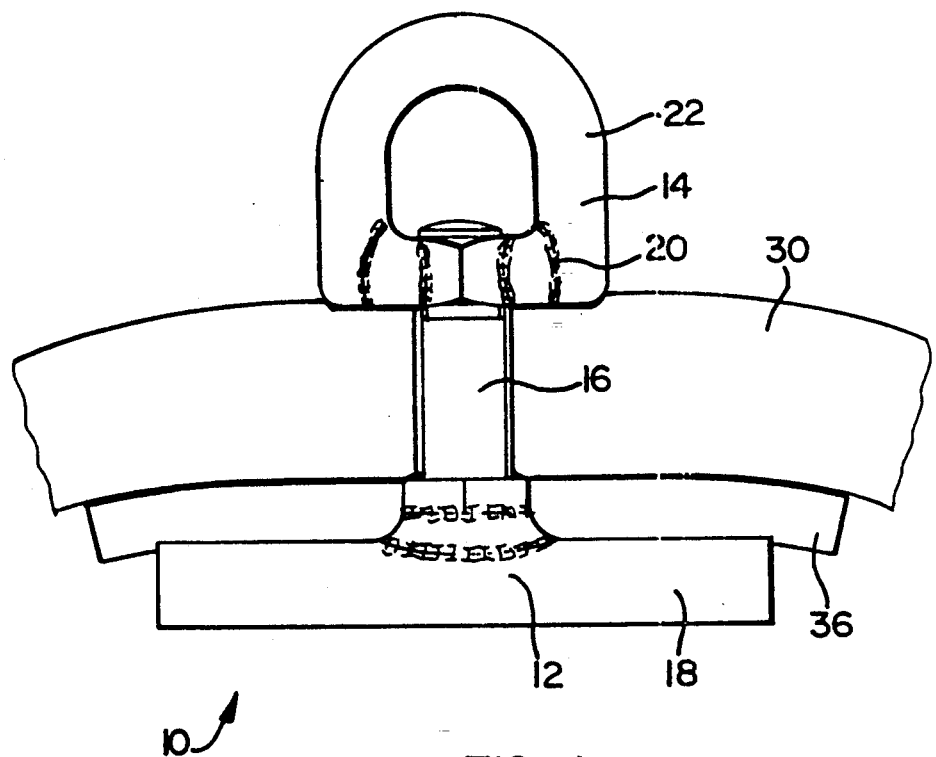

United States Patent [19]

van der Veen

[11] Patent Number: 5,193,477
[45] Date of Patent: Mar. 16, 1993

[54] METHOD OF SECURING A TIRE FENDER TO A QUAY SIDE OR A VESSEL

[76] Inventor: Anton Van Der Veen, 70 Lower Bridge Road, Durban North, Natal, South Africa, 4051

[21] Appl. No.: 636,068

[22] Filed: Dec. 28, 1990

[51] Int. Cl.⁵ ............................................. B63B 59/02
[52] U.S. Cl. ................................................... 114/219
[58] Field of Search ................ 114/219, 220; 405/212, 405/213

[56] References Cited

U.S. PATENT DOCUMENTS 2,179,125  11/1939  Kirlin ................................. 114/219
3,286,680  11/1966  Caretta .............................. 114/219
4,022,452   5/1977  Dupre ................................ 114/219
4,055,136  10/1977  Fujisawa et al. .................. 114/219

Primary Examiner—Edwin L. Swinehart
Assistant Examiner—Stephen P. Avila
Attorney, Agent, or Firm—Darby & Darby

[57] ABSTRACT

A method of securing a tire fender to a quay side or a vessel includes the steps of initially securing two spaced fasteners on a tire, each fastener providing an engagement loop that can cooperate with a shackle for securing a chain thereto. By suitably securing two chains between a quay side or a vessel and the said fasteners, the tire fender can be effectively suspended in its required configuration.

4 Claims, 1 Drawing Sheet

METHOD OF SECURING A TIRE FENDER TO A QUAY SIDE OR A VESSEL

This invention relates to a method of securing a tire fender to a quay side or a vessel and to a fastener for carrying out this method.

Tire fenders are commonly secured to quay sides and vessels for protecting quay side walls and vessel walls against damage that may be otherwise caused by vessels abutting against quay sides or against one another. Reference is hereinafter made only to a method of securing a tire fender to a quay side and it must be understood that any such reference must be interpreted to include securing of a tire fender to a vessel, which can be equivalently effected in accordance with the method of the invention.

Used aircraft tires and tires used on large agricultural and other machines and implements are commonly used as fenders and are conventionally secured by being suspended on the side of a quay side wall by means of a chain having opposite ends secured to the quay side and passing through two spaced holes formed in the tread wall of a particular tire. Heavy duty chains are used for this purpose and large holes therefore are required within tires through which chains can pass.

It will be understood that by being suspended in the manner above described, significant movement between a tire and a chain can occur and because of the rigors to which tire fenders are exposed, extensive wear occurs very quickly, particularly in the region of the holes formed in the tires, resulting in tire fenders suspended in this manner having a relatively short life, either because of being separated from their chains and being lost or because of the need to be regularly replaced. Also, the more damaged a tire fender becomes, the less effective it will be for reducing damage to vessels and quay sides, damage to tire fenders mainly being due to the mode in which they are commonly suspended.

Accordingly, it is an object of this invention to provide an improved method of securing a tire fender to a quay side and still further, it is an object of this invention to provide a fastener that will facilitate securing of a tire fender to a quay side.

According to the invention there is provided a method of securing a tire fender to a quay side, which includes providing two fasteners, each fastener including a fastener bolt, having a head formation and a shank, that is at least partially threaded, extending from the head formation, and a fastener nut comprising a nut formation that can screw on the shank of the fastener bolt, and an engagement loop fast with and projecting from the said nut formation;

forming a hole for the shank of each fastener bolt in predetermined spaced locations in the thread wall of the tire fender and passing the shank of a fastener bolt through each hole from the interior side of the tire fender;

screwing the nut formations on the respective fastener bolt shanks; and connecting two suspension chains, one end of which are secured in spaced locations to a quay side, to the engagement loops of the respective fastener nuts by means of shackles that can simultaneously engage a link of a chain and an engagement loop.

The method of the invention particularly may include forming the holes in the thread wall of the tire fender in positions so that extension lines extending from lines defined by the suspension chains, in the operative configuration when a tire fender is suspended thereby, will pass through the centre of the tire.

Still further, the method of the invention includes placing a washer between the head formations of each fastener bolt and the tire through which the shank of each fastener bolt is passed.

Further according to the invention, there is provided a fastener for securing a tire fender to a quay side, which includes a fastener bolt having a head formation and a shank, that is at least partially threaded, extending from the head formation; and a fastener nut comprising a nut formation that can screw on the shank of the fastener bolt and an engagement loop fast with and projecting from the said nut formation.

The head formation of the fastener bolt may be a cross bar forming a T-shaped configuration with the shank of the fastener bolt.

Also, the fastener may include a washer that can fit on the shank of the fastener bolt and can abut the head formation of the fastener bolt.

The engagement loop of the fastener nut may define the shape and configuration of approximately one half of a conventional chain link.

Further features of the invention are described in more detail hereinafter, with reference to an example of the invention, illustrated by way of drawings.

Figure 2:
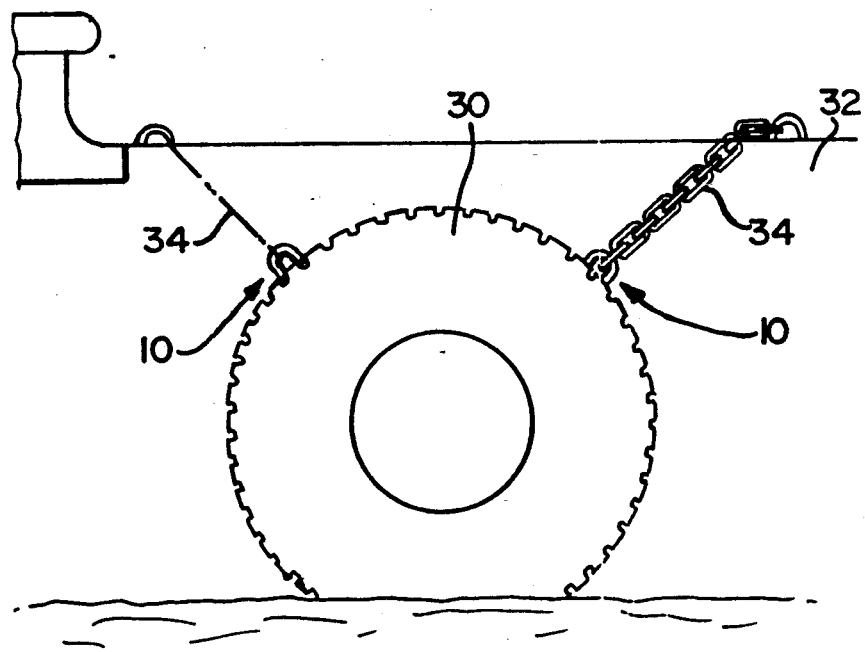

The invention is now described, by way of an example, with reference to the accompanying diagrammatic drawings, in which:

FIG. 1 shows a side view of a fastener for carrying out the method of securing a tire fender to a quay side, in accordance with the invention, in an operative configuration thereof with respect to the wall of a tire fender; and FIG. 2 illustrates the method of securing a tire fender to a quay side by utilising the fastener as shown in FIG. 1.

Referring to the drawings, a fastener for use in securing a tire fender to a quay side, in accordance with the method of the invention, is indicated generally by the reference numeral 10. The fastener 10 includes a fastener bolt 12 and a fastener nut 14.

The fastener bolt defines a T-shaped configuration including a partially threaded shank 16 extending from a cross bar 18 forming the head of the bolt. The complete bolt 12 can be made up as a unit in the form of a casting or, alternatively, may incorporate a conventional bolt with the cross bar 18 welded to the head of the bolt.

The fastener nut 14 includes a nut formation 20 that can screw on the threaded part of the shank 16 of the bolt 12 and an engagement loop 22, defining a closed loop, forming an effective part of the nut formation 20. According to one particular embodiment, the engagement loop formation 22 is defined by one half of a chain link, which is welded to a conventional nut to form the configuration clearly illustrated in FIG. 1 of the drawings. The fastener nut 14 also can be made up of any alternative components or be manufactured as a unit in the form of a casting.

Securing a tire fender to a quay side in harbours or on to the side walls of vessels such as ships or boats, in accordance with the method of the invention, requires initially the formation of two spaced holes in the tread wall of a tire fender 30, each hole being dimensioned to permit the shank 16 of a fastener bolt 12 to pass snugly therethrough. The fastener bolts of the fasteners particularly pass through the holes from the inside of the tire fender 30, it being anticipated that a rubber washer 36 be positioned between the cross bar 18 of each bolt 12 and the tire fender 30.

Fastener nuts 14 are then tightened on the bolt 12 to form the configuration shown, the engagement loops 22 thereafter facilitating the connection of chains 34 with the fasteners by means of shackles, or the like.

As is clearly seen in FIG. 2 of the drawings, the opposite ends of the chains 34 are secured to loop formations that are cast into the quay side 32 to which the tire fender must be secured, the said loop formations commonly being located upon formation of the quay side. The opposite free ends of the chains are then secured to the engagement loops 22 by means of shackles as described. As is clear from FIG. 2, the position of the holes in the tread wall of the tire fender 30 are such that an extension of the straight lines defined by the chains 34, in the operative configuration of the tire fender 30, will pass through the centre of the tire fender. This will ensure that no unnecessary forces act on the tire fender 30, which can cause damage thereto, the tire fender being fixedly secured to the chains and not permitting relative displacement with respect to the chains, damage thus only being possible as a result of the normal rigors to which tire fenders are exposed as a result of providing protection between vessels and quay sides or between vessels as such.

It is believed that the method of the invention greatly facilitates the securing of tire fenders to quay side walls and to the outer walls of boats or ships. The fastener bolt and fastener nut of the fastener as described may be of any suitable material such as of malleable cast iron, if cast, or of any high tensile metal alloy, as may be considered suitable.

In addition to the simplicity of the mode of suspension, which will greatly reduce the time required for suspending tire fenders, tire fenders will have an increased life insofar as the problems associated with known methods of securing tire fenders to quay sides are now largely overcome.

I claim:

1. A method of securing a tire fender to a vessel or quay side, comprising the steps:

providing two fasteners, each said fastener including a fastener bolt having a head and a shank, the head comprising a cross bar forming a T-shaped configuration with the shank which is at least partially threaded and extends from the head, each said fastener having a fastener nut threadable onto the shank of said fastener bolt, and an engagement loop fixed to and projecting from said nut;

providing a vehicle tire having a generally cylindrical tread wall that defines an outer circular periphery of said tire fender;

forming a respective hole in said tread wall for the shank of each said fastener bolt to pass therethrough, said holes being at predetermined spaced locations;

passing said shank of a fastener bolt through each said hole from the interior side of said tire fender and orienting said cross bar in said tire as a chord of said circular periphery;

threading said nuts on respective fastener bolt shanks to fixedly position said fasteners on said tire fender;

providing a plurality of shackle means including chains for engaging each said engagement loop;

engaging one end of each of said chains with a respective engagement loop on said tire;

connecting the other end of each said chain to respective spaced locations on said vessel or quay side, whereby said tire fender is suspended from said vessel or quay side by said chains.

2. A method as in claim 1, in which the holes formed in the tread wall of the tire fender are positioned so that an extension of the lines defined by the suspension chains, in an operative configuration when a tire fender is suspended on said chains, passes substantially through the center of said circular periphery of the tire.

3. A method as in claim 1, and further comprising the steps of placing a washer between the head of each fastener bolt and the tire and passing the shank of each fastener bolt through said washer.

4. A method as in claim 1, wherein said shanks fit said holes in said tread wall with a snug fit.

* * * * *